Patented Feb. 12, 1946

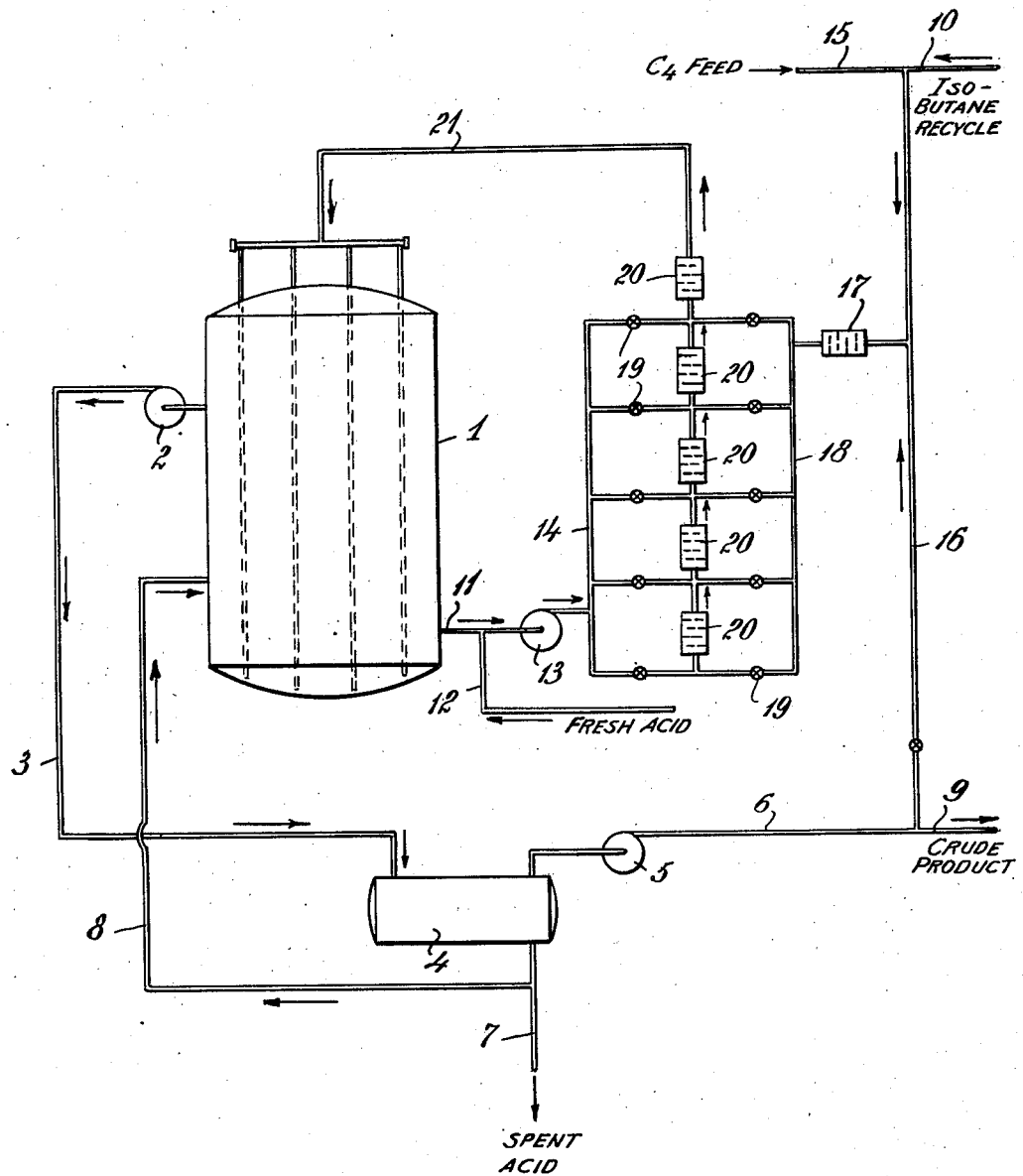

2,394,696

UNITED STATES PATENT OFFICE 2,394,696

ALKYLATION

Reginald A. Kinnear, Harold B. Chamberlain, Jack F. McCanne, George T. Fails, and John C. Gordon, Beaumont, Tex., assignors to Socony-Vacuum Oil Company, Incorporated, New York, N. Y., a corporation of New York Application January 28, 1942, Serial No. 428,446

9 Claims. (Cl. 260—683.4)

This invention relates to process and apparatus for alkylation of iso-paraffins with olefins in the presence of a fluid acid catalyst and is particularly concerned with process steps for preparation and mixing of the reaction mass in such reactions as well as apparatus adapted to practice of said steps.

In processes of the present type, an iso-paraffin and an olefin, for example, iso-butane and butylene, are reacted in the presence of a fluid acid catalyst such as sulphuric acid, hydrofluoric acid and the like, to produce high anti-knock hydrocarbons within the gasoline boiling range. The iso-paraffin is normally in a mixture of $C_4$ hydrocarbons resulting from refinery operations or other suitable source, said mixture also containing the 4 carbon atom olefins with which the iso-butane is to be alkylated. This mixture, suitably enriched with additional iso-paraffin to maintain the desired ratio of reactants, is mixed with the acid catalyst and passed to a reactor. In a strict sense, the entire system containing reactants and catalyst constitutes the reaction zone but in this specification and in the appended claims the term "reaction zone" will be used to designate the region wherein a reaction mass is maintained, i. e., the reactor. From the reactor two streams are withdrawn, usually in continuous manner. One of the withdrawn streams is passed to a settling drum wherein the acid catalyst separates from an oily layer consisting of alkylated, unreacted hydrocarbons and the like. The separated acid is returned in part to the reaction mass and the remainder is withdrawn from the system as spent catalyst. The oily layer is treated to remove the desired product and separate a light fraction containing the iso-paraffin which is then recirculated for admixture with fresh feed. A portion of the crude product mixture containing unreacted iso-paraffin is sometimes returned to the reaction mass as such without fractionation.

The second stream withdrawn from the reactor is used in establishing and maintaining a circuit of reaction mass external to the reactor. Fresh hydrocarbon feed and fresh acid catalyst are added to this external circuit of hydrocarbon-acid emulsion which is made to serve several important purposes. It is essential that a high ratio of paraffins to olefins be maintained in order to minimize polymerization of the olefins. Recirculation of the reaction mass to and from a large body of reaction mixture in the reactor result in building up a large excess of tertiary paraffins in the system when these are fed to the reaction in molar excess, as is the normal practice. The external circuit is also of importance in maintaining adequate contact of reactants with catalyst. A mixing device in the external circuit itself causes establishment of an emulsion of recycled reaction mass, fresh and recycled acid, and fresh feed. This emulsion is introduced to the reactor in such manner as to provide constant agitation of the large body of fluids therein. Auxiliary means may also be provided for this purpose such as stirrers and/or bottom eductor as described in the copending application of Julius B. Middleton, Serial No. 422,361 filed December 10, 1941. The external circuit is also utilized as a means of controlling the reaction temperature. Cooling coils are provided in this circuit to augment the effect of direct temperature control applied to the reactor and to ensure that such reaction as occurs in the external emulsion circuit shall not upset conditions in the reactor by overheating of the stream to the reactor.

In spite of careful control by means of the expedients discussed above, there still remain problems of operation, important among which are features connected with introduction of materials to and control of the external circuit. Reaction is, of course, initiated as soon as reactants and catalyst are brought into contact. Improper control at this point may result in extremely reduced yields of excessively low quality. We have developed a process and apparatus lending itself to ready and accurate control as regards rapid compensation for variations in operating conditions as well as stable operation under relatively constant conditions.

Essentially, the invention contemplates a plurality of mixing devices in series in the external emulsion circuit. Means are preferably provided for supplying both recycled reaction mass admixed with fresh catalyst and fresh feed stock admixed with recycled hydrocarbons to the mixing stream in portions in advance of each of the mixers. Additional improvement in operation is achieved by using, as a substantial proportion of recycled hydrocarbons, the crude alkylate product separated from acid catalyst and supplied to the system in a specific manner described hereinafter. It is further preferred that an unusually large excess of iso-paraffin be maintained in the total hydrocarbon feed as supplied to the external circuit.

The nature of the invention and additional objects and advantages thereof will be apparent from consideration of a specific form thereof illustrated in the attached drawing which is a diagrammatic showing of a portion of an alkylation unit constructed in accordance with the invention for alkylation of iso-butane with butylene.

A large body of reaction mixture, including fluid acid catalyst, unreacted hydrocarbons and reaction products, is maintained in a reactor 1, from which a stream is continuously withdrawn through pump 2 and passed by pipe 3 to a settling drum 4. In drum 4, the mass separates to form a hydrocarbon layer which is withdrawn through pump 5 and pipe 6, and an acid layer which is withdrawn and split into a stream rejected from the system through line 7 as spent catalyst and a stream returned to the reactor through line 8.

The hydrocarbon stream passed through line 6 constitutes crude product, at least a portion of which is transferred through line 9 to a distillation system wherein it is fractionated to obtain the desired alkylate free of unreacted $C_4$ hydrocarbons. The latter are closely fractionated to recover the iso-butane portion thereof which is returned to the process by way of pipe 10.

A second stream passes from the reactor by way of line 11 and is joined by a stream of fresh acid catalyst from line 12, after which the mixture is propelled by pump 13 to a manifold 14 for supply to devices for mixing it with hydrocarbons to be supplied to the reactor. The said hydrocarbons are a mixture prepared prior to contact with the emulsion from pipe 13 by adding iso-butane recycled from the distillation operation to the fresh $C_4$ feed stock comprising iso-butane and butylenes from line 15. Preferably these hydrocarbons are further augmented by the addition thereto of hydrocarbons separated from acid in drum 4 and supplied for that purpose through line 16. The mixture of hydrocarbons is passed through a mixing device 17 and supplied to a manifold 18.

An important aspect of the invention is a preferred composition of the mixture in manifold 18. Whereas the art has normally employed isoparaffin to olefin ratios on the order of 3 or 4 to 1; we have found that marked improvement is obtained by so proportioning the supply of reactants from the several sources thereof as to maintain a ratio of between about 15 and 30 to 1. The hydrocarbon feed as first brought into contact with the acid catalyst therefore contains at least 15 and not more than 30 parts of isoparaffin for each part of olefin by weight.

The emulsion from manifold 14 and the hydrocarbons from manifold 18 are thoroughly admixed with each other in a plurality of mixing devices 20 in series, which devices may be of any suitable design such as baffled chambers, orifice mixers, nozzles and the like. From the mixers 20, the emulsion is returned to the reactor through line 21. A very efficient mixer suitable for the purpose is described in application Serial No. 422,362, filed December 10, 1941, by Julius B. Middleton. Although good results are obtained by joining the complete streams from the two manifolds and passing the mixture through the series of mixers 20, we prefer to split the feed from at least one and preferably both of the manifolds and supply the fluids therefrom to the external circuit in portions; each portion being delivered to the mixing line in advance of a mixing device 20.

The mixers 20 are suitably cooled, as by heat exchange coils in the usual manner and the concept of split feed aids greatly in maintaining adequate cooling effect as well as greatly smoothing the course of the initial reaction at the time of first contact of fresh feed with catalyst. The latter effect is accentuated by returning a portion of the crude product with the fresh feed stock, an effect which is not obtained when such material is returned directly to the emulsion circuit. In both cases, of course, the load on the distillation system is reduced materially while maintaining desired conditions of concentration ratios within the system.

As shown in the drawing, the branch pipes supplying fluids from manifolds 14 and 18 to series of mixers 20 are equipped with valves 19. Depending on operating conditions, the flow of either or both fluids to the entry of any mixer 20 may be modified. If desired, the entire flow of either or both manifolds may be routed to the first mixer in the series at the discretion of the operator. This flexibility of mixing control coupled with the large heat exchange capacity acting on fluids in turbulent flow is an important aspect of the invention. Another advantageous feature is the extensive contact between the mixed fluids provided by the present invention.

We claim:

1. The process which comprises maintaining in a reaction zone a reaction mass resulting from the alkylation of tertiary paraffins with olefins in the presence of a fluid acid catalyst, withdrawing a first stream from said mass, settling said first stream in a settling zone to separate a crude product from catalyst, separating unreacted tertiary paraffins from a portion of said crude product, passing a second portion of said crude product for return to the reaction zone, withdrawing a second stream from said reaction mass, adding fresh catalyst to said second stream to form a recycle mixture, admixing fresh feed stock containing olefins and tertiary paraffins with said second portion of said crude product and with said separated tertiary paraffin to form a hydrocarbon feed mixture, separating each of said mixtures into a plurality of portions, mixing one portion of each of said mixtures with each other to form a reaction mixture, passing said reaction mixture through a plurality of agitating zones in series, agitating said reaction mixture in each of said agitating zones, adding an additional portion of each of said recycle mixture and said feed mixture between each pair of successive agitating zones, and passing the so agitated reaction mixture to said reaction zone.

2. The process which comprises maintaining in a reaction zone a reaction mass resulting from the alkylation of tertiary paraffins with olefins in the presence of a fluid acid catalyst, withdrawing a first stream from said mass, settling said first stream to separate a crude product from catalyst, separating unreacted tertiary paraffins from a portion of said crude product, passing a second portion of said crude product for return to the reaction zone, withdrawing a second stream from said reaction mass, adding fresh catalyst to said second stream to form a recycle mixture, admixing fresh feed stock containing olefins and tertiary paraffins with said second portion of said crude product and with said separated tertiary paraffin to form a hydrocarbon feed mixture, separating one of said mixtures into a plurality of portions, mixing one portion of said mixture so separated with at least a part of the other of said mixtures to form a reaction mixture, passing said reaction mixture through a plurality of agitating zones in series, agitating said reaction mixture in each of said agitating zones, adding an additional portion of said separated mixture between each pair of successive agitating zones, and passing the so agitated reaction mixture to said reaction zone.

3. The process which comprises maintaining in a reaction zone a reaction mass resulting from the alkylation of tertiary paraffins with olefins in the presence of a fluid acid catalyst, withdrawing a stream from said mass, adding fresh catalyst to said stream to form a recycle mixture, providing a hydrocarbon feed mixture, containing tertiary paraffins and olefins, separating each of said mixtures into a plurality of portions, mixing one portion of each of said mixtures with each other to form a reaction mixture, passing said reaction mixture through a plurality of agitating zones in series, agitating said reaction mixture in each of said agitating zones, adding an additional portion of each of said recycle mixture and said feed mixture between each pair of successive agitating zones, and passing the so agitated reaction mixture to said reaction zone.

4. The process which comprises maintaining in a reaction zone a reaction mass resulting from the alkylation of tertiary paraffins with olefins in the presence of a fluid acid catalyst, withdrawing a stream from said mass, adding fresh catalyst to said stream to form a recycle mixture, providing a hydrocarbon feed mixture, containing tertiary paraffins and olefins, separating one of said mixtures into a plurality of portions, mixing one portion of said mixture so separated with at least a part of the other of said mixtures to form a reaction mixture, passing said reaction mixture through a plurality of agitating zones in series, agitating said reaction mixture in each of said agitating zones, adding an additional portion of said separated mixture between each pair of successive agitating zones, and passing the so agitated reaction mixture to said reaction zone.

5. The process which comprises maintaining in a reaction zone a reaction mass resulting from the alkylation of isobutane with butylene in the presence of a fluid acid catalyst, withdrawing a first stream from said mass, settling said first stream in a settling zone to separate a crude product from catalyst, separating unreacted iso-butane from a portion of said crude product, passing a second portion of said crude product for return to the reaction zone, withdrawing a second stream from said reaction mass, adding fresh catalyst to said second stream to form a recycle mixture, admixing fresh feed stock containing butylene and tertiary paraffins with said second portion of said crude product and with said separated iso-butane to form a hydrocarbon feed mixture, separating each of said mixtures into a plurality of portions, mixing one portion of each of said mixtures with each other to form a reaction mixture, passing said reaction mixture through a plurality of agitating zones in series, agitating said reaction mixture in each of said agitating zones, adding an additional portion of each of said recycle mixtures and said feed mixture between each pair of successive agitating zones, and passing the so agitated reaction mixture to said reaction zone.

6. The process which comprises maintaining in a reaction zone a reaction mass resulting from the alkylation of isobutane with butylene in the presence of a fluid acid catalyst, withdrawing a first stream from said mass, settling said first stream to separate a crude product from catalyst, separating unreacted iso-butane from a portion of said crude product, passing a second portion of said crude product for return to the reaction zone, withdrawing a second stream from said reaction mass, adding fresh catalyst to said second stream to form a recycle mixture, admixing fresh feed stock containing butylene and isobutane with said second portion of said crude product and with said separated isobutane to form a hydrocarbon feed mixture, separating one of said mixtures into a plurality of portions, mixing one portion of said mixture so separated with at least a part of the other of said mixtures to form a reaction mixture, passing said reaction mixture through a plurality of agitating zones in series, agitating said reaction mixture in each of said agitating zones, adding an additional portion of said separated mixture between each pair of successive agitating zones, and passing the so agitated reaction mixture to said reaction zone.

7. The process which comprises maintaining in a reaction zone a reaction mass resulting from the alkylation of isobutane with butylene in the presence of a fluid acid catalyst, withdrawing a stream from said mass, adding fresh catalyst to said stream to form a recycle mixture, providing a hydrocarbon feed mixture, containing isobutane and butylene, separating each of said mixtures into a plurality of portions, mixing one portion of each of said mixtures with each other to form a reaction mixture, passing said reaction mixture through a plurality of agitating zones in series, agitating said reaction mixture in each of said agitating zones, adding an additional portion of each of said recycle mixtures and feed mixture between each pair of successive agitating zones, and passing the so agitated reaction mixture to said reaction zone.

8. The process which comprises maintaining in a reaction zone a reaction mass resulting from the alkylation of isobutane with butylene in the presence of a fluid acid catalyst, withdrawing a stream from said mass, adding fresh catalyst to said stream to form a recycle mixture, providing a hydrocarbon feed mixture, containing isobutane and butylene, separating one of said mixtures into a plurality of portions, mixing one portion of said mixture so separated with at least a part of the other of said mixtures to form a reaction mixture, passing said reaction mixture through a plurality of agitating zones in series, agitating said reaction mixture in each of said agitating zones, adding an additional portion of said separated mixture between each pair of successive agitating zones, and passing the so agitated reaction mixture to said reaction zone.

9. The process which comprises maintaining in a reaction zone a reaction mass resulting from the alkylation of tertiary paraffins with olefins in the presence of a fluid acid catalyst, withdrawing a first stream from said mass, settling said first stream in a settling zone to separate a crude product from catalyst, separating unreacted tertiary paraffins from a portion of said crude product, passing a second portion of said crude product for return to the reaction zone, withdrawing a second stream from said reaction mass, adding fresh catalyst to said second stream to form a recycle mixture, admixing fresh feed stock containing olefins and tertiary paraffins with said second portion of said crude product and with said separated tertiary paraffin to form a hydrocarbon feed mixture, separating each of said mixtures into a plurality of portions, mixing one portion of each of said mixtures with each other to form a reaction mixture, passing said reaction mixture through a plurality of agitating zones in series, agitating said reaction mixture in each of said agitating zones, adding an additional portion of each of said recycle mixture and said fresh feed mixture between each pair of successive agitating zones, and passing the so agitated reaction mixture to said reaction zone, said hydrocarbon feed mixture containing at least about 15 and not more than about 30 parts of said tertiary paraffin for each part of said olefin by weight.

REGINALD A. KINNEAR.
HAROLD B. CHAMBERLAIN.
JACK F. McCANNE.
GEORGE T. FAILS.
JOHN C. GORDON.